US012694888B2

(12) United States Patent
Sun et al.

(10) Patent No.: US 12,694,888 B2
(45) Date of Patent: Jul. 28, 2026

(54) SOURCE SEPARATION AND REMIXING IN SIGNAL PROCESSING

(71) Applicant: DOLBY LABORATORIES LICENSING CORPORATION

(72) Inventors: Jundai Sun, Beijing (CN); Zhiwei Shuang, Beijing (CN); Yuanxing Ma, Beijing (CN)

(73) Assignee: DOLBY LABORATORIES LICENSING CORPORATION

( * ) Notice: Subject to any disclaimer, the term of this patent is extended or adjusted under 35 U.S.C. 154(b) by 124 days.

(21) Appl. No.: 18/709,129

(22) PCT Filed: Oct. 26, 2022

(86) PCT No.: PCT/US2022/047830
§ 371 (c)(1),
(2) Date: May 10, 2024

(87) PCT Pub. No.: WO2023/091276
PCT Pub. Date: May 25, 2023

(65) Prior Publication Data
US 2025/0046328 A1 Feb. 6, 2025

Related U.S. Application Data

(60) Provisional application No. 63/288,996, filed on Dec. 13, 2021, provisional application No. 63/336,824, filed on Apr. 29, 2022.

(30) Foreign Application Priority Data

Nov. 18, 2021 (WO) ................ PCT/CN2021/131462
May 4, 2022 (EP) .................................... 22171560

(51) Int. Cl.
*G10L 25/93* (2013.01)
*G10L 21/0208* (2013.01)
(Continued)

(52) U.S. Cl.
CPC ............ *G10L 21/028* (2013.01); *G10L 25/84* (2013.01); *G10L 25/93* (2013.01)

(58) Field of Classification Search
CPC ....... G10L 21/028; G10L 25/84; G10L 25/93; G10L 21/0208; G10L 25/30
(Continued)

(56) References Cited

U.S. PATENT DOCUMENTS 7,191,127 B2 3/2007 Lorenzo
7,983,907 B2 7/2011 Visser
(Continued)

FOREIGN PATENT DOCUMENTS

GB 2456296 A * 7/2009 ............. H04R 25/00
JP 3812887 B2 * 8/2006 ............. G10L 25/78

OTHER PUBLICATIONS

Li Ruwei et al: "Speech separation based on reliable binaural cues with two-stage neural network in noisy-reverberant environments", Applied Acoustics, Elsevier Publishing, GB, vol. 168, Jun. 10, 2020 (Jun. 10, 2020). 17 pages.
(Continued)

*Primary Examiner* — George C Monikang

(57) ABSTRACT

The present disclosure relates to a method and audio processing system (1) for performing source separation. The method comprises obtaining (S1) an audio signal ($S_{in}$) including a mixture of speech content and noise content, determining (S2*a*, S2*b*, S2*c*), from the audio signal, speech content (formula A), stationary noise content (formula C) and non-speech content (formula B). The stationary noise content (formula C) is a true subset of the non-speech content (formula B) and the method further comprises determining (S3), based on a difference between the stationary noise content (formula C) and the non-speech content (formula B) a non-stationary noise content formula D),
(Continued)

obtaining (S5) a set of weighting factors and forming (S6) a processed audio signal based on a combination of the speech content (formula A), the stationary noise content (formula C), and the non-stationary noise content (formula D) weighted with their respective weighting factor.

$(\hat{S}_1)$ formula A $(\hat{N}_1)$ formula B $(\hat{N}_2)$ formula C $(\hat{N}_{NS})$ formula D

18 Claims, 6 Drawing Sheets

(51) Int. Cl.
*G10L 21/028* (2013.01)
*G10L 25/30* (2013.01)
*G10L 25/84* (2013.01)

(58) Field of Classification Search
USPC ........ 704/202, 208, 214, 226, 231–232, 246
See application file for complete search history.

(56) References Cited

U.S. PATENT DOCUMENTS

| | | | |
|---|---|---|---|
| 8,407,045 | B2 | 3/2013 | Erell |
| 8,494,853 | B1 | 7/2013 | Mengibar |
| 8,560,320 | B2 | 10/2013 | Yu |
| 8,639,502 | B1 | 1/2014 | Boucheron |
| 9,449,610 | B2 | 9/2016 | Lamy |
| 9,805,738 | B2 | 10/2017 | Krini |
| 10,535,362 | B2 | 1/2020 | Bryan |
| 2013/0211832 | A1 | 8/2013 | Talwar |
| 2020/0312343 | A1 | 10/2020 | Hsiung |
| 2021/0029473 | A1 | 1/2021 | Cantu |

OTHER PUBLICATIONS

Westhausen Nils Let Al: "Reduction of Subjective Listening Effort for TV Broadcast Signals With Recurrent Neural Networks", IEEE/ACM Transactions on Audio, Speech, and Language Processing, IEEE, USA, vol. 29, Nov. 13, 2021 (Nov. 13, 2021), pp. 3541-3550. 10 pages.

* cited by examiner

SOURCE SEPARATION AND REMIXING IN SIGNAL PROCESSING

CROSS-REFERENCE TO RELATED APPLICATION

This application is a U.S. National Stage application under U.S.C. 371 of International Application No. PCT/US2022/047830, filed on 26 Oct. 2022, which claims priority of the following priority application: International application PCT/CN2021/131462, filed 18 Nov. 2021, U.S. provisional application 63/288,996, filed 13 Dec. 2021 and U.S. provisional application 63/336,824, filed 29 Apr. 2022 and EP patent application Ser. No. 22/171,560.0, filed 4 May 2022, each of which is hereby incorporated by reference in its entirety.

TECHNICAL FIELD OF THE INVENTION

The present invention relates to a method and audio processing system for source separation and remixing.

BACKGROUND OF THE INVENTION

Recorded audio signals may comprise a representation of one or more audio sources in addition to a noise component. Especially for User Generated Content (UGC) it is in general true that many individual audio sources will be picked up in addition to a noise audio component (such as white noise) when recording audio.

Consider e.g. a user recording the audio track of a video, recording a podcast or making a phone call using a headset or smartphone from the sidewalk of a busy street or in a forest during windy conditions. The recorded audio signal from the busy street could for instance, in addition to the voice of the user, include the voices of other nearby pedestrians, the ringtone of a nearby pedestrian's cellphone, the sound of passing cars or busses, sounds from a nearby construction site, the sound of a siren from an emergency vehicle and the noise component. Similarly, the recorded audio signal from the forest could for instance include the voice of the user, birdsong, the sound of an airplane passing above, the sound of the wind rattling the leaves and noise.

The recorded audio signal will comprise audio from all of these recorded sound sources which makes a desired audio signal, e.g. the voice of the user recording a video or making a phone call, less intelligible. To this end, neural network models for speech separation have been proposed which are capable of receiving an audio signal comprising recorded speech alongside other audio sources and noise as an input and output either a processed audio signal with enhanced speech intelligibility or a speech isolation filter (often referred to as a "mask") for suppressing the non-speech audio components of audio signal. Accordingly, by using neural network models the intelligibility of speech present in audio signals can be enhanced allowing users to record audio signals at many locations.

In other situations, especially for Professionally Generated Content (PGC) such as the recording of an audio track for a movie, all audio sources, or at least additional audio sources in addition to the recorded voice may be of interest. For instance, for a movie audio track which is recorded in a forest during windy conditions the sound of a voice, the sound of the rattling leaves and birdsong are desired audio signal components whereas the sound of an airplane passing above is an undesired audio signal component. Accordingly, a neural network for speech separation may be used to the enhance the intelligibility of the voice whereby individually recorded audio signals containing only birdsong and only the sound of rattling leaves are mixed with the intelligibility enhanced speech to achieve a desired mix of audio sources for the movie audio track. Wherein the final mix has enhanced speech intelligibility but also comprises birdsong and the sound of rattling leaves, but not the sound of a passing airplane, which provides a desirable and believable ambience effect.

GENERAL DISCLOSURE OF THE INVENTION

A draw back with the prior solutions is that while many neural network models perform well in terms of removing noise components each model is trained to remove a specific type of predetermined noise. Due to different definitions of noise, a single neural network model will perform well if the definition of noise used to train the model overlaps with the undesired noise which is to be removed. However, as soon as the trained model is applied to remove noise which is defined differently from the noise definition used during training the noise suppression performance decreases.

For instance, the trained speech separation model may be aggressive and trained to treat all audio signals components which are not speech as noise. Using such a speech separation on e.g. a movie audio track where speech, birdsong and the sound of leaves rattling are all desired audio signals will suppress the birdsong and the sound of the leaves rattling to isolate only the speech. On the other hand, using a less aggressive speech separation model, which e.g. is trained to predict and remove only the stationary background noise will suppress only the stationary background noise and not e.g. the unwanted sound of an airplane momentarily passing above (which is not an example of stationary background noise).

Thus, it is a purpose of the present disclosure to provide an enhanced method for audio processing which alleviates at least some of the draw backs of the above-mentioned existing solutions.

A first aspect of the present invention relates to a method of processing audio for source separation, the method comprising obtaining an audio signal including a mixture of speech content and noise content, determining speech content from the audio signal, determining stationary noise content from the audio signal, and determining non-speech content, from the audio signal, wherein the stationary noise content is a true subset of the non-speech content. The method further comprises, determining, based on a difference between the stationary noise content and the non-speech content a non-stationary noise content, obtaining a set of weighting factors comprising a weighting factor corresponding to each of the speech content, the stationary noise content, and the non-stationary noise content respectively, and forming a processed audio signal based on a combination of the speech content, the stationary noise content, and the non-stationary noise content weighted with the respective weighting factor.

With stationary noise content it is meant noise content which remains constant over time and which does not carry any interpretable information. White noise or thermal noise are both examples of stationary noise. Further examples of stationary noise are pink noise, Gaussian noise, any noise which e.g. is introduced by an audio amplifier and any noise with a time-independent distribution.

Non-speech may be defined as the difference between a clean speech audio signal (such as a speech signal recorded in an anechoic chamber with any stationary noise removed)

and a clean speech audio signal with added disturbances (such as stationary noise or birdsong). That is, non-speech content comprises stationary noise but also other types of non-stationary noise such as birdsong or the sound of rain.

The first aspect of the invention is at least partially based on the understanding that by extracting the non-stationary noise as the difference between non-speech content and the stationary noise content two independent noise content types are obtained in addition to the independent speech content. This facilitates remixing as the relative magnitude of the three content types is adjusted by selecting a desired set of weighting coefficients. For example, by adjusting the three weighting coefficients the stationary noise content is omitted entirely, the non-stationary noise is attenuated but not omitted entirely and the speech content is amplified which results in a processed audio signal with enhanced speech intelligibility while also providing some amount of ambience (as at least a portion of the non-stationary noise content being kept).

In some implementations, determining the stationary noise content comprises providing the audio signal to a stationary noise isolator model trained to predict a stationary noise mask for removing stationary noise content from the audio signal and determining the stationary noise content based on the stationary noise mask and the audio signal.

Thus, an accurate trained model (e.g. implemented with a neural network) may be used to determine the stationary noise content given a representation of an audio signal. Stationary noise content may be defined precisely, and large amounts of training data is readily available, may be recorded or created synthetically which means stationary noise isolator model can be trained to be very accurate.

Similarly, in some implementations determining the non-speech content comprises providing the audio signal to a speech isolator model trained to predict a noise mask for removing non-speech content from the audio signal; and determining non-speech content based on the noise mask and the audio signal.

Separating speech from arbitrary audio signals may be performed accurately with a model (e.g. implemented with a neural network) trained to predict mask for separating speech content provided a representation of an audio signal. Additionally, the same mask used to extract the speech content may also be used to extract non-speech content meaning that the same trained model may be used to determine both the speech content and the non-speech content.

While it is difficult to train a model to separate between different types of noise, such as stationary noise content and non-stationary noise content, some implementations of the first aspect of the present invention utilizes trained models adapted for separation of more distinctly different types of audio content, such as speech and stationary noise, and a subsequent manipulation of the separated audio content comprising to more accurately separate different types of noise. The manipulation comprising determining the difference between the stationary noise and the non-speech content.

In some implementations, the method further comprises bandpass filtering the non-stationary noise content with a bandpass filter configured to isolate a noise object in the non-stationary noise.

That is, while the non-stationary noise may comprise audio content associated with a plurality of non-stationary noise objects the application of a suitable bandpass filter will isolate at least one desired noise object. A benefit of applying the bandpass filter to the non-stationary noise content is that the filter will not let through any speech-content or stationary noise content as this is not present in the non-stationary noise content.

In some implementations, the bandpass filter has been obtained by analyzing an example audio signal wherein the method further comprises collecting an example audio signal, the example audio signal comprising at least one example of a noise object, determining the frequency distribution of the example audio signal and defining the bandpass filter based on the frequency distribution of the example audio signal.

To this end, the frequency distribution of any arbitrary non-stationary object(s) may be determined and used to generate a bandpass filter for the filtering the non-stationary noise.

According to a second aspect of the invention there is provided an audio processing system, the audio processing system comprising an audio content separation unit, the audio content separation unit being configured to obtain an audio signal, the audio signal including a mixture of speech content and noise content and determine, from the audio signal, speech content, stationary noise content, and non-speech content, wherein the stationary noise content is a true subset of the non-speech content. The audio content separation unit is further configured to determine, based on a difference between the stationary noise content and the non-speech content a non-stationary noise content, and the audio processing system further comprising a mixing unit configured to: obtain a set of weighting factors, comprising a weighting factor corresponding to each of the speech content, the stationary noise content, and the non-stationary noise content respectively, and forming a processed audio signal based on a combination of the speech content, the stationary noise content, and the non-stationary noise content weighted with the respective weighting factor.

According to a third aspect of the invention there is provided a non-transitory computer-readable medium storing instructions that, upon execution by one or more processors, cause the one or more processor to perform the method according to the first aspect of the invention.

BRIEF DESCRIPTION OF THE DRAWINGS

Aspects of the present invention will be described in more detail with reference to the appended drawings, showing currently preferred embodiments.

DETAILED DESCRIPTION OF CURRENTLY PREFERRED EMBODIMENTS

Systems and methods disclosed in the present application may be implemented as software, firmware, hardware or a combination thereof. In a hardware implementation, the division of tasks does not necessarily correspond to the division into physical units: to the contrary, one physical component may have multiple functionalities, and one task may be carried out by several physical components in cooperation.

The computer hardware may for example be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that computer hardware. Further, the present disclosure shall relate to any collection of computer hardware that individually or jointly execute instructions to perform any one or more of the concepts discussed herein.

Certain or all components may be implemented by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system (i.e. a computer hardware) that includes one or more processors. Each processor may include one or more of a CPU, a graphics processing unit, and a programmable DSP unit. The processing system further may include a memory subsystem including a hard drive, SSD, RAM and/or ROM. A bus subsystem may be included for communicating between the components. The software may reside in the memory subsystem and/or within the processor during execution thereof by the computer system.

The one or more processors may operate as a standalone device or may be connected, e.g., networked to other processor(s). Such a network may be built on various different network protocols, and may be the Internet, a Wide Area Network (WAN), a Local Area Network (LAN), or any combination thereof.

Figure 1A:
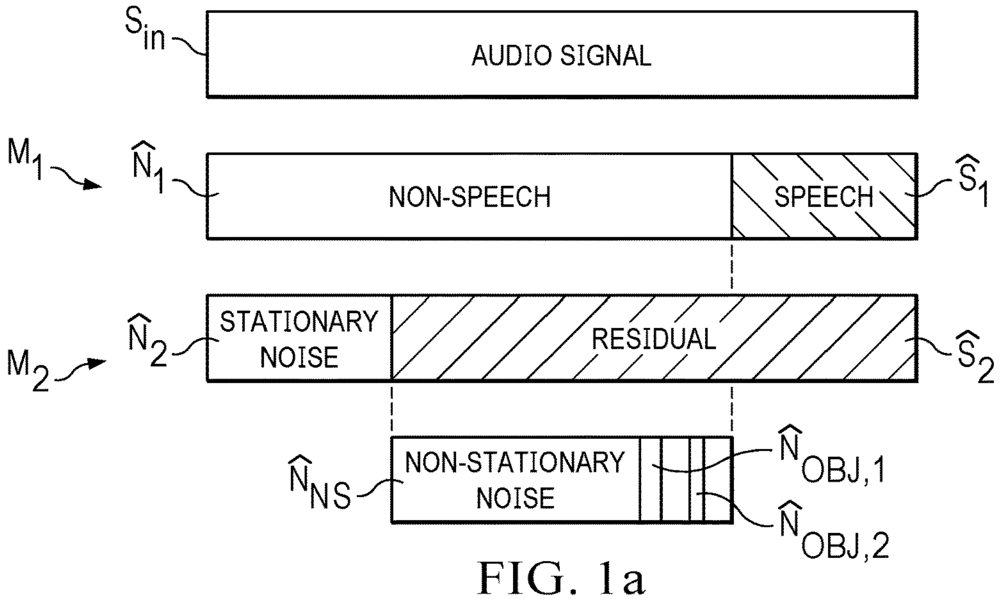
FIG. 1*a-b* illustrate an audio signal being separated into non-speech content, speech content, stationary noise content and residual content according to some implementations.

The software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, physical (non-transitory) storage media in various forms, such as EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media (transitory) typically embodies computer readable instructions, data structures, program modules or other data in a modulated data signal such as a carrier wave or other transport mechanism and includes any information delivery media. FIG. 1*a* depicts schematically an audio signal $S_{in}$. The audio signal $S_{in}$ is a mixture of a desired source s and noise n, wherein the desired source s e.g. is speech content. The audio signal Sin may be a mono audio signal, a stereo audio signal or even a multi-channel audio signal with more than two channels (e.g. the audio signal is 5.1 or 7.1.2 audio signal).

FIG. 1*a* depicts schematically an audio signal $S_{in}$. The audio signal $S_{in}$ is a mixture of a desired source s and noise n, wherein the desired source s e.g. is speech content. The audio signal $S_{in}$ may be a mono audio signal, a stereo audio signal or even a multi-channel audio signal with more than two channels (e.g. the audio signal is 5.1 or 7.1.2 audio signal).

The audio signal $S_{in}$, which comprises a mixture of speech and noise content, may be referred to as x(k) in the time domain where k is the time sample index. Thus, x(k) may be expressed as $$x[k] = s[k] + n[k] \tag{1}$$

in the time domain. By transforming the time domain representation in equation 1 to the spectral domain it is derived that $$X_{m,f} = S_{m,f} + N_{m,f} \tag{2}$$

where X, S, N denote the time-frequency (T-F) representations of the audio signal mixture x(k), source s, and the noise n while the subscripts m and f denote the time frame index and frequency bin index respectively.

The audio signal $S_{in}$ may be provided to a trained model wherein the trained model has been trained to output a mask $M_1$, $M_2$ for suppressing a certain type of noise wherein the mask $M_1$, $M_2$ is typically defined as the magnitude ratio between the desired speech $S_{m,f}$ and the audio signal mixture $X_{m,f}$ for each time frame and frequency bin. That is, the mask M is defined as $$M(m, f) = \frac{|S_{m,f}|}{|X_{m,f}|}. \tag{3}$$

Depending on the type and training of the mask predicting model the mask $M_1$, $M_2$ may suppress different types of noise. While FIG. 1*a* depicts that a portion of the audio signal $S_{in}$ is separated by the mask $M_1$, $M_2$ this is merely a simple illustrative example and the illustration should not be interpreted to merely describe e.g. a time and frequency frame. It is clear from equation 3 that the mask $M_1$, $M_2$ comprises a plurality of mask values, one for each time and frequency bin which in general is a real number between zero and one describing the extent to which each time and frequency bin should be suppressed.

Figure 1B:
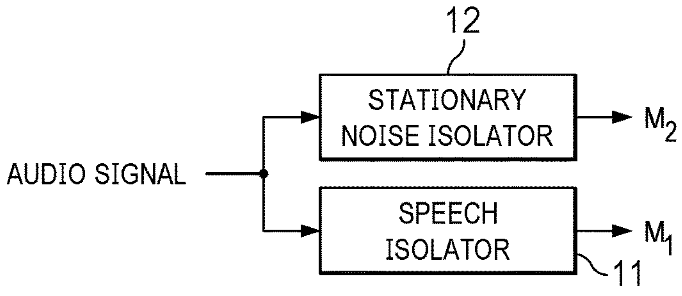

With further reference to FIG. 1*b* an implementation is shown wherein the audio signal $S_{in}$ is provided to a first trained model 11 trained to output a first mask $M_1$ which suppresses all audio components of the audio signal $S_{in}$ which is non-speech $\hat{N}_1$. Applying, mask $M_1$ to the audio signal $S_{in}$ leaves only what is considered by the trained model to be speech $\hat{S}1$. This first trained model 11 may be used to perform aggressive speech intelligibility enhancement as all sounds not considered to be speech $\hat{N}_1$ are removed by the mask $M_1$ and, while this is suitable in some cases, this type of speech intelligibility enhancement is unsuitable in some cases. In the audio track of a video, for instance, where characters are speaking on a busy street the aggressive speech intelligibility enhancement will remove any traffic sounds from the street which are important for context and immersion.

The second trained model 12 is trained to output a mask $M_2$ for suppressing only the stationary noise content $\hat{N}_2$ of the audio signal $\hat{S}_{in}$ and leave all audio content which is not stationary noise content, which is referred to as the residual content $\hat{S}_2$, unaffected. Applying the mask $M_2$ to the audio signal $S_{in}$ effectively removes stationary noise, which remains constant over time (i.e. noise with a probability distribution which is constant over time), while other types of noise which are potentially undesired (e.g. the sound of nearby car revving its engine) are unaffected.

By using these two trained models simultaneously, the first model 11, a speech isolator model, trained to output a first mask $M_1$ and the second model 12, a stationary noise isolator model, trained to output a second mask $M_2$, wherein the first mask $M_1$ is for suppressing non-speech $\hat{N}_1$ and the second mask $M_2$ is for suppressing stationary noise $\hat{N}_2$ four partial representations of the audio signal $S_{in}$ may be obtained. The estimated speech content $\hat{S}_1$ and non-speech content $\hat{N}_1$ (i.e. noise such as birdsong and stationary noise) of the first model 11 are obtained as $$\hat{S}_1 = X \times M_1 \tag{4}$$

$$\hat{N}_1 = X \times (1 - M_1) = X - \hat{S}_1 \tag{5}$$

and, similarly, the estimated residual content $\hat{S}_2$ (i.e. all content but the stationary noise content) and stationary noise content $\hat{N}_2$ of the second model 12 is obtained as $$\hat{S}_2 = X \times M_2 \tag{6}$$

$$\hat{N}_2 = X \times (1 - M_2) = X - \hat{S}_2. \tag{7}$$

The output audio signal, $S_{out}$, can now be determined by combining $\hat{S}_1$, $\hat{S}_2$, $\hat{N}_1$ and $\hat{N}_2$ from equations 4, 5, 6 and 7 as:

$$S_{out} = \alpha_1 \times \hat{S}_1 + \beta_1 \times \hat{S}_2 + \gamma_1 \times \hat{N}_1 + \mu_1 \times \hat{N}_2 \tag{8}$$

where $\alpha_1$, $\beta_1$, $\gamma_1$, $\mu_1$ are weighting factors for each of the speech content $\hat{S}_1$, the residual content $\hat{S}_2$, the non-speech content $\hat{N}_1$ and the stationary noise content $\hat{N}_2$ respectively. Alternatively, the output audio signal $S_{out}$ from equation 8 can be rewritten in terms of the input audio signal mix X, the speech content $\hat{S}_1$ and the residual content $\hat{S}_2$ as $$S_{out} = c_1 \times \hat{S}_1 + c_2 \times \hat{S}_2 + c_3 \times X \tag{9}$$

wherein $c_1$, $c_2$, $c_3$ is an alternative set of weighting factors. It is understood that the same output audio signal Sout may be acquired with both equation 8 and 9 which means that there exists a mapping between the weighting factors $\alpha_1$, $\beta_1$, $\gamma_1$, $\mu_1$ and the weighting factors $c_1$, $c_2$, $c_3$. However, as will now be described, the representation from equation 8 has some properties which can be exploited.

The above audio signal components $\hat{S}_1$, $\hat{S}_2$, $\hat{N}_1$ and $\hat{N}_2$ from equation 8 are not independent as e.g. the speech content $\hat{S}_1$ may be comprised partially or wholly in the residual content $\hat{S}_2$ which means that it may not be possible to achieve a desired mix of the components from equation 8. To this end, the non-speech content $\hat{N}_1$ and the stationary noise content $\hat{N}_2$ are used to define a new type of noise content referred to as the non-stationary noise content $\hat{N}_{NS}$ or the object noise content, which is defined as $$\hat{N}_{NS} = \hat{N}_1 - \hat{N}_2. \tag{10}$$

and the stationary noise content $\hat{N}_2$ is renamed $\hat{N}_S$, meaning that $$\hat{N}_S = \hat{N}_2. \tag{11}$$

The stationary noise content $\hat{N}_S$ and the non-stationary noise content $\hat{N}_{NS}$ are independent parts of the audio signal $\hat{S}_{in}$ (as opposed to $\hat{N}_1$ and $\hat{N}_2$ which are dependent) wherein the stationary noise content $\hat{N}_S$ captures e.g. white noise and the non-stationary noise content $\hat{N}_{NS}$ captures all content which is neither stationary noise content nor speech content. Examples of non-stationary noise $\hat{N}_{NS}$ include birdsong, the sound of rattling leaves, the sound of cars, airplanes, helicopters and sirens, the sound of gusts of wind, the sound of rain or thunder. Each of these examples, in addition to other not mentioned examples, forms a respective noise object $\hat{N}_{OBJ,1}$. $\hat{N}_{OBJ,2}$ wherein each noise object $\hat{N}_{OBJ,1}$. $\hat{N}_{OBJ,2}$ is a true subset of the non-stationary noise content $\hat{N}_{NS}$ and associated with a certain type of audio content or audio content with a certain audio source (e.g. a machine, animal or vehicle).

Accordingly, the audio signal components $\hat{S}_1$, $\hat{S}_2$, $\hat{N}_S$ and $\hat{N}\hat{N}_S$ are combined in a manner similar to equation 8, as $$S_{out} = \alpha_2 \times \hat{S}_1 + \beta_2 \times \hat{S}_2 + \gamma_2 \times \hat{N}_S + \mu_2 \times \hat{N}_{NS} \tag{12}$$

wherein $\alpha_2$, $\beta_2$, $\gamma_2$, $\mu_2$ are weighting factors and $\gamma_2$ and $\mu_2$ will influence the extent to which the stationary noise $\hat{N}_S$ and non-stationary noise $\hat{N}_{NS}$ is introduced into the output audio signal $S_{out}$. For instance, if $\mu_2$ is high the non-stationary noise content such as the noise objects $\hat{N}_{OBJ,1}$, $\hat{N}_{OBJ,2}$ will be emphasized in the processed audio signal $\hat{S}_{out}$ and if $\gamma_2$ is set to zero the stationary noise is omitted entirely, whereby the balance between $\alpha_2$, $\beta_2$, and $\mu_2$ will influence the relative volume of the non-stationary noise with respect the speech $\hat{S}_1$ and the residual $\hat{S}_2$.

It is noted that the output signal $S_{out}$ as calculated with equation 12 using $\hat{S}_1$, $\hat{S}_2$, $\hat{N}_S$. $\hat{N}_{NS}$, may alternatively be expressed in terms of $\hat{S}_1$, $\hat{S}_2$, $\hat{N}_1$, $\hat{N}_2$ from equation 8 or in terms of $\hat{S}_1$, $\hat{S}_2$, X from equation 9. Accordingly, there exists a mapping between all three sets of weighting coefficients, namely the weighting coefficients $\alpha_2$, $\beta_2$, $\gamma_2$, $\mu_2$, the weighting coefficients $\alpha_1$, $\beta_1$, $\gamma_1$, $\mu_1$ and the weighting coefficients $c_1$, $c_2$, $c_3$. However, the representation from equation 12 has the benefit of featuring three independent content types (if $\hat{S}_2$ is omitted) which facilitates more accurate remixing of the output audio signal $\hat{S}_{out}$.

In some implementations, $\beta_1$ or $\beta_2$ is set to zero or the residual content $\hat{S}_2$ is omitted from equation 8 and 12 as $\hat{S}_2$ will involve some overlap between both the speech content $\hat{S}_1$ and the non-speech content $\hat{N}_1$ as predicted by the first trained model 11.

Figure 2:
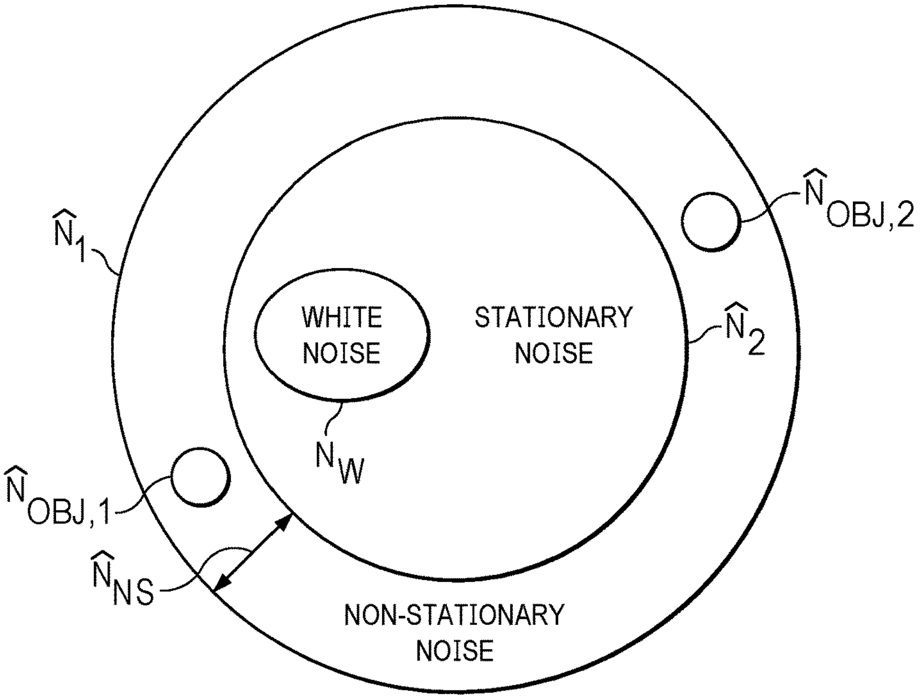
FIG. 2 illustrates different types of non-speech content which the audio processing system according to some implementations isolates from the audio signal.

With reference to FIG. 2 the different types of non-speech content $\hat{N}_1$ are illustrated schematically. As seen the non-speech content $\hat{N}_1$ comprises stationary noise content $\hat{N}_2$ wherein the stationary noise content in turn comprises different forms of stationary noise content, such as white noise $\hat{N}_w$. The difference between the stationary noise content $\hat{N}_2=\hat{N}_S$ and the non-speech audio content $\hat{N}_1$ defines the non-stationary noise content $\hat{N}_{NS}$ which in turn comprises one or more noise objects $\hat{N}_{OBJ,1}$. $\hat{N}_{OBJ,2}$ which are neither speech nor stationary noise content (e.g. birdsong).

Figure 3A:
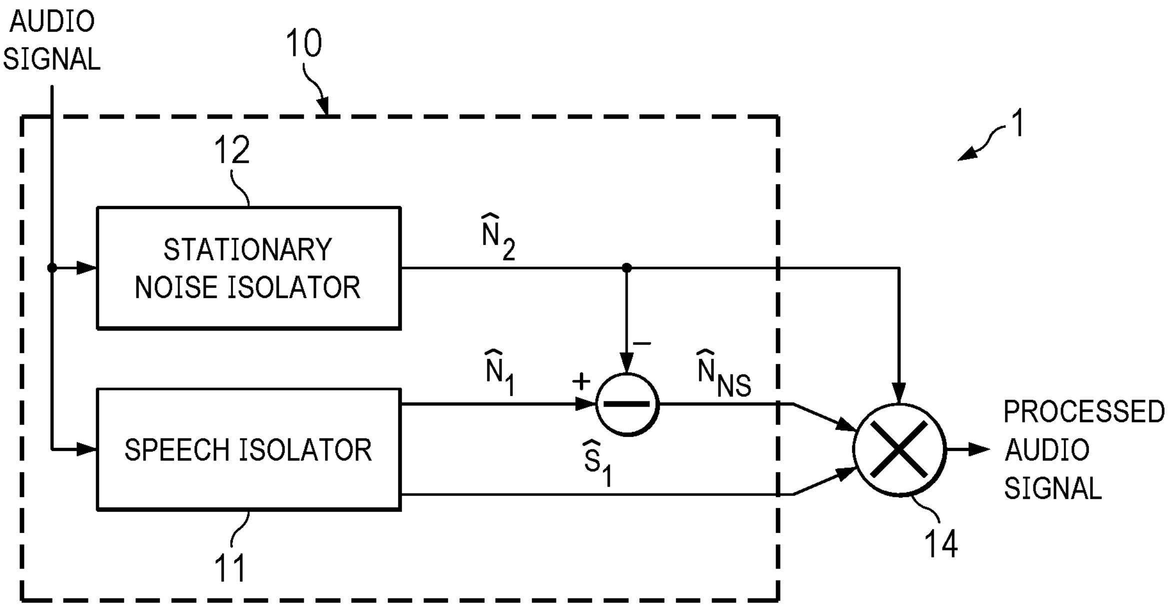
FIG. 3*a-c* are block diagrams illustrating different audio processing systems for source separation according to some implementations.
Figure 4:
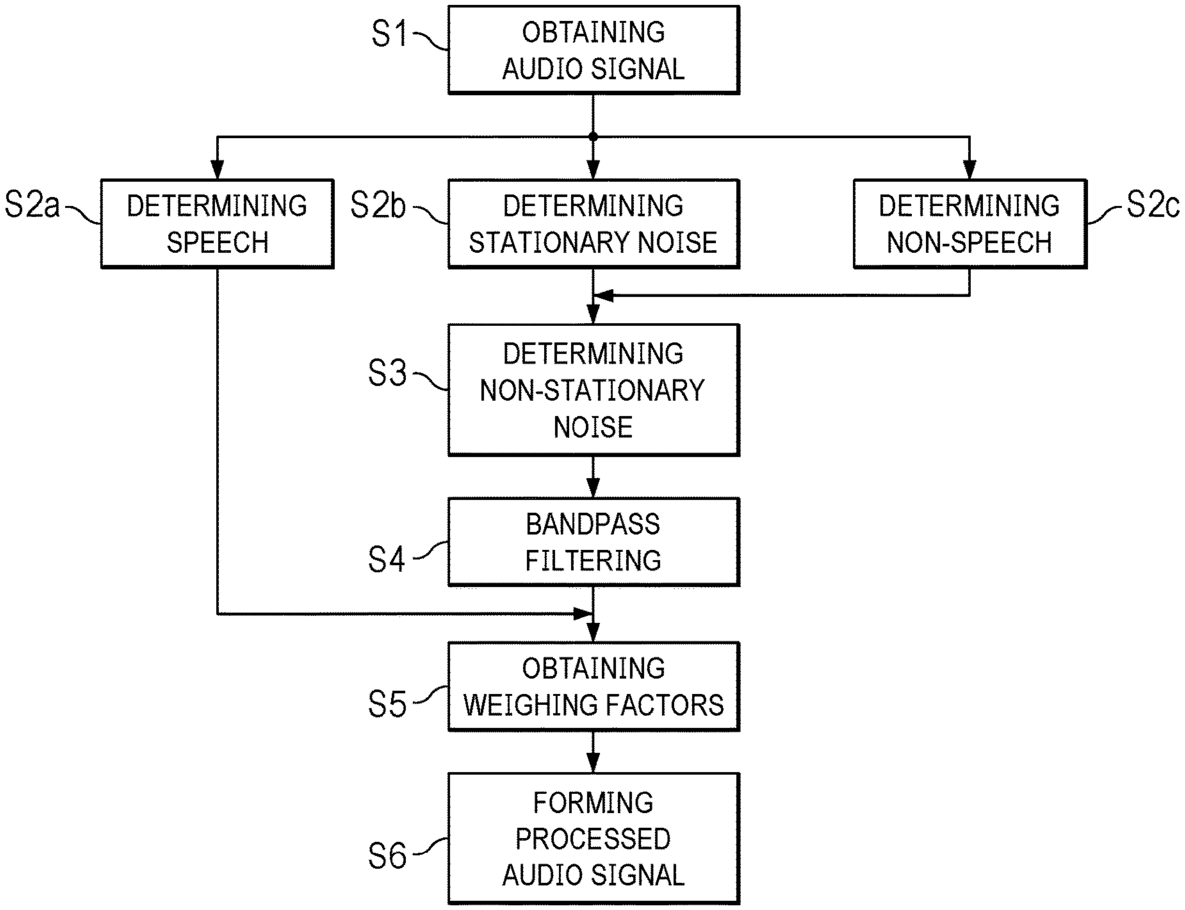
FIG. 4 is a flowchart describing a method according to some implementations.

FIG. 3*a* depicts a block diagram of an audio processing system 1, and with further reference to the flow chart of FIG. 4, a method for performing audio processing for source separation according to some implementations will now be described in detail.

At step S1 an audio signal comprising a mix of speech content and noise content is obtained and provided to an audio separation unit 10. The audio separation unit 10 comprises a speech isolator model 11 trained to predict a mask $M_1$ for separating the speech content $\hat{S}_1$ from the non-speech content $\hat{N}_1$ in the audio signal. By applying the mask $M_1$ to the audio signal, e.g. in accordance with equation 4 and 5 in the above, the speech content $\hat{S}_1$ and non-speech content $\hat{N}_1$ is determined at step S2*a* and step S2*c* respectively.

Analogously, the audio signal is provided to the stationary noise isolator model 12 trained to predict a mask $M_2$ for separating the residual audio content $\hat{S}_2$ from the stationary noise content $\hat{N}_2$. By applying the mask $M_2$ to the audio signal, e.g. in accordance with equation 7 in the above, at least the stationary noise content $\hat{N}_2$ is determined at step S2*b*.

At step S3 the non-stationary noise content $\hat{N}_{NS}$ is determined by the audio separation unit 10 as the difference between the non-speech content $\hat{N}_1$ predicted by the speech isolator model 11 and the stationary noise $\hat{N}_2$ as predicted by the stationary noise isolator model 12. Alternatively, the audio separation unit 10 outputs the speech content $\hat{S}_1$, the non-speech content $\hat{N}_1$ and the stationary noise content $\hat{N}_2$ whereby the non-stationary noise content $\hat{N}_{NS}$ is determined by an auxiliary computation unit.

The method may then go to step S5 which comprises obtaining at least one weighting factor for each of the speech content $\hat{S}_1$, the stationary noise content $\hat{N}2=\hat{N}_S$ and the non-stationary noise content $\hat{N}_{NS}$. The weighting factors are e.g. predetermined or set by a user/mixing engineer to obtain a desired mix of the independent speech content $\hat{S}_1$, stationary noise content $\hat{N}_2$-$\hat{N}_S$ and non-stationary noise content $\hat{N}_{NS}$ in the output audio signal. Additionally, as will be described in the below, a selector may select or suggest a set of weighting coefficients based on the detected noise objects present in the audio signal.

At step S6 the speech content $\hat{S}_1$, the stationary noise content $\hat{N}_2=\hat{N}_S$ and the non-stationary noise content $\hat{N}_{NS}$ are combined by the mixer unit 14 with their respective weighting factor to form the processed audio signal, e.g. in accordance with equation 12 in the above. That is, the different independent content types of the audio signal are remixed to form a processed output audio signal.

Figure 3B:
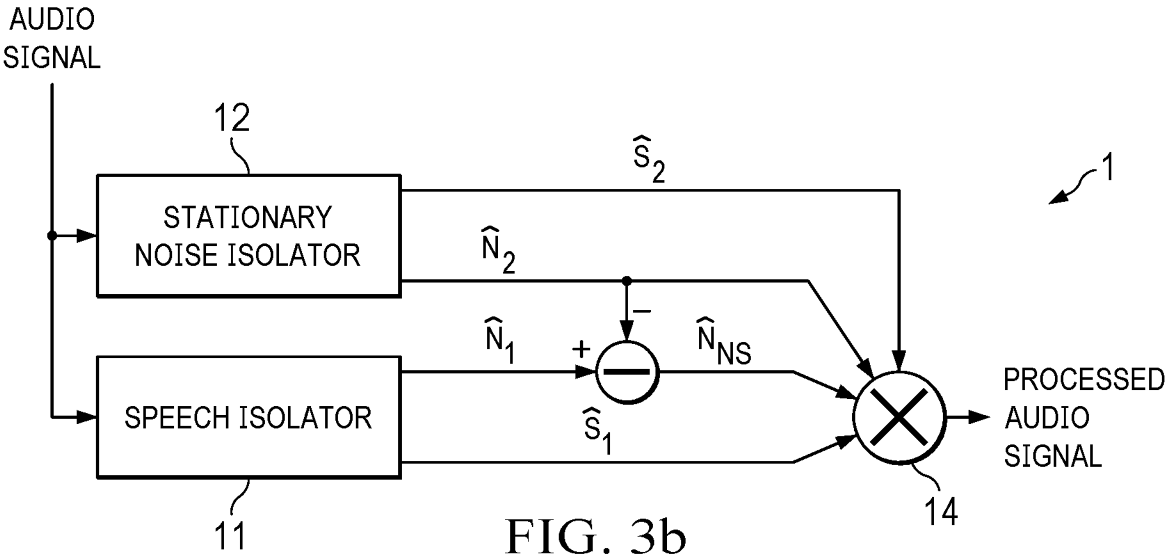

Optionally, as seen in the exemplary implementation in FIG. 3*b*, both the stationary noise content $\hat{N}_2$ and the residual content $\hat{S}_2$ is determined at step S2*b*, e.g. by using equations 6 and 7 in the above, whereby both the stationary noise content $\hat{N}_2$ and the residual content $\hat{S}_2$ are used in the combination at the mixer unit 14 with a respective weighting factor.

Figure 3C:
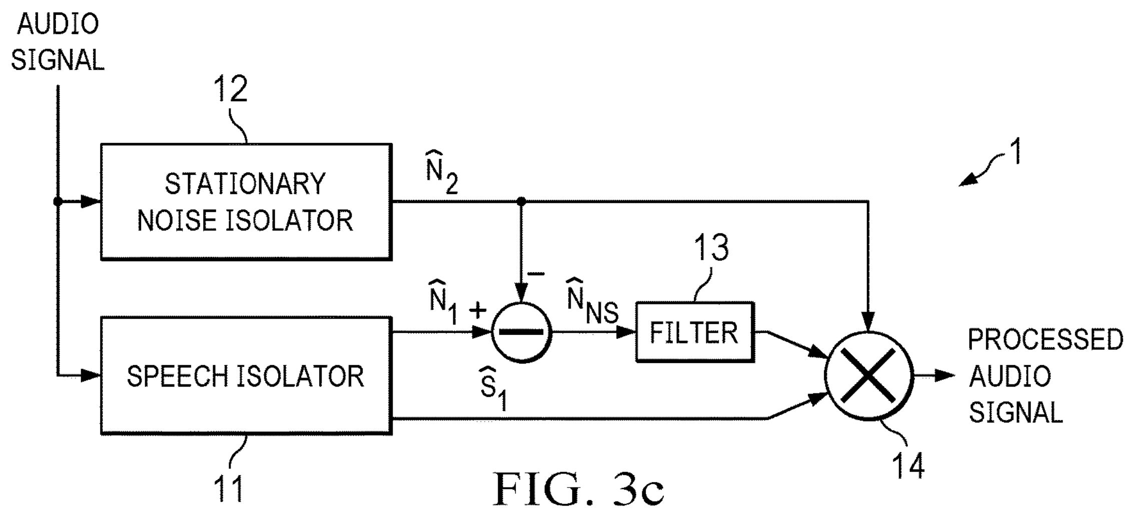
Figure 6A:
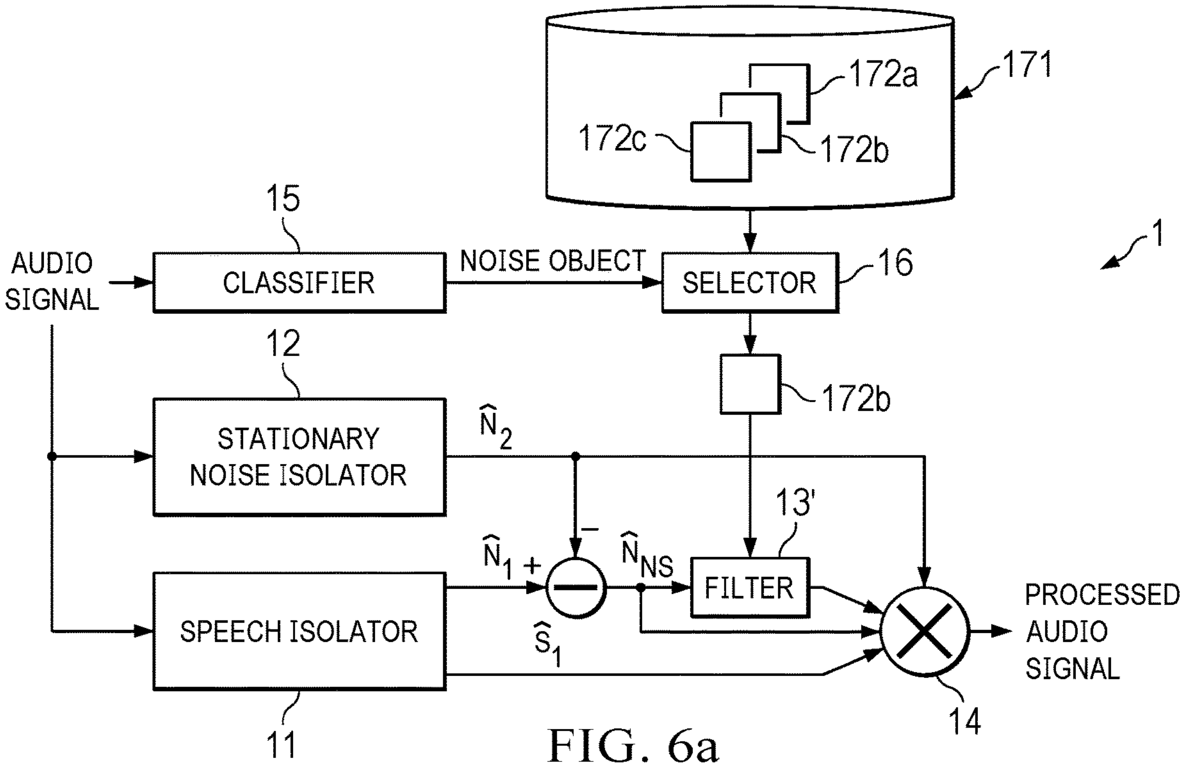
FIG. 6*a-c* show different alternatives of audio processing systems with a classifier and selector according to some implementations.

FIG. 3*c* shows another optional implementation, wherein the non-stationary noise is $\hat{N}_{NS}$ processed with a bandpass filter 13 at step S3 prior to being fed to the mixer unit 14. Additionally, the filtered non-stationary noise may be smoothed with a smoothing kernel or smoothing filter (not shown) prior to being fed to the mixer unit 14. The implementation in FIG. 3*c* may e.g. be combined with other implementations, such as the implementation shown in FIG. 3*b*. Moreover, it is envisaged that both the non-stationary noise is $N_{NS}$ and the non-stationary noise processed with the filter 13 may be provided to the mixing unit 14 as illustrated in FIG. 6*a*.

The filter 13 may in turn be determined by collecting an example audio signal, the example audio signal comprising at least one example of a (non-stationary) target noise object such as birdsong or a group of target noise objects such as traffic sounds, and determining the frequency distribution of the example audio signal. The frequency distribution of the example audio signal will reveal the energy distribution of the audio signal whereby a suitable bandpass filter 13 may be defined with a passband which allows at least a predetermined portion of the example audio signal to pass through. For instance, the bandpass filter 13 is defined to be as narrow as possible but still feature a passband which allows at least 50%, and preferably at least 70%, and most preferably at least 90% of the energy of the test signal to pass through. That is, the bandpass filter 13 will filter attenuate noise objects different the target noise object(s).

To obtain a more accurate bandpass filter 13, the example audio signal should comprise a clean example of the target noise object or group of noise objects. To this end the target audio signal may be manually cleaned to remove audio components or noise which is not an example of the target noise object(s) or cleaned with a reliable automatic process. Additionally, a longer example audio signal, with more/longer examples of the target noise object(s) is preferred to avoid averaging errors. For instance, the example audio signal comprises at least one hour, and preferably at least five hours and most preferably at least ten hours of noise object audio content.

As an illustrative example, the target noise object is birdsong whereby an example audio signal with ten hours of clean birdsong is obtained and the frequency distribution determined. The frequency distribution reveals that most of the example signal energy is contained between 3 kHz and 7 kHz whereby a bandpass filter 13 with a passband between 3 kHz and 7 kHz, and a stopband which starts at 1 KHz and 9 kHz respectively, is defined to separate the birdsong from other noise objects present in the non-stationary noise $\hat{S}_{NS}$.

Figure 5:
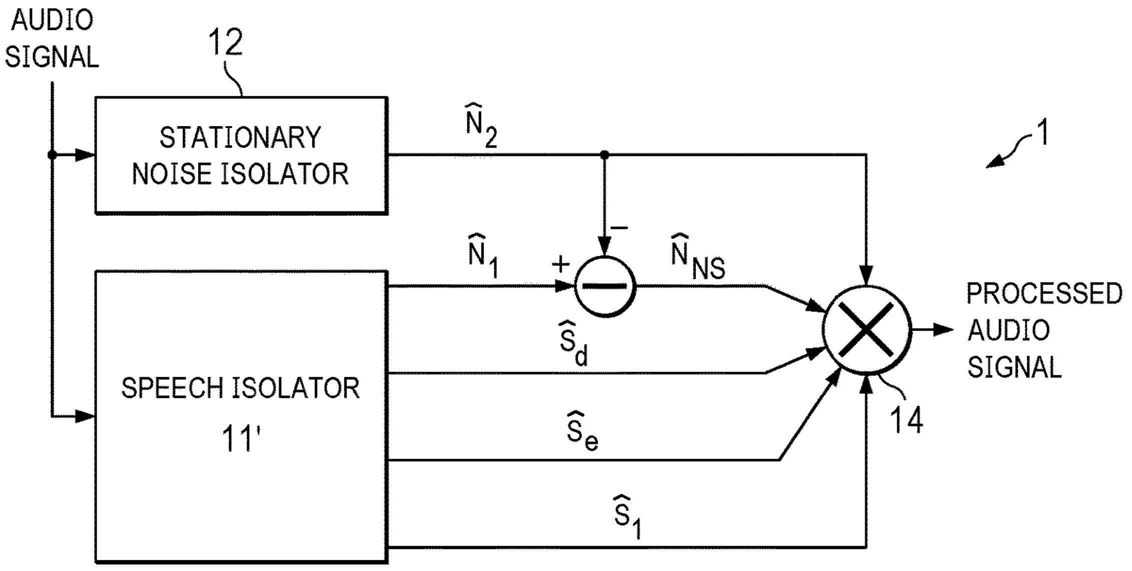
FIG. 5 is a block diagram illustrating an audio processing system according to some implementations, with a speech isolator model for separating at least two different types of speech content.

FIG. 5 depicts an audio processing system 1 identical to the audio processing system described in connection to FIG. 3*a* aside from the presence of a different type of speech isolator model 11'. The speech isolator model 11' in FIG. 5 is trained to obtain an audio signal and predict at least two masks so as to isolate at least two different types of speech present in the audio signal. In the implementation shown, the speech isolator model 11' predicts three masks to separate speech without reverberation, which is called dry speech, $\hat{S}_d$, dry speech with early reverberation $\hat{S}_e$ and dry speech with early reverberation and with late reverberation $\hat{S}_d$. The different speech types $\hat{S}_d$, $\hat{S}_e$, $\hat{S}_d$ are provided to the mixing unit 14 and added to the stationary noise content $\hat{S}_S$ and the non-stationary noise content $\hat{S}_{NS}$ with a respective weighting factor for each of the speech types. Accordingly, equation 12 (with or without the residual content $\hat{S}_2$) which describes the formation of output audio signal, $S_{out}$, in the mixing unit 14 may be modified by replacing speech content $S_1$ with $\hat{S}_{tot}$ wherein $$\hat{S}_{tot} = \alpha_1 \times \hat{S}_d + \alpha_2 \times \hat{S}_e + \alpha_1 \times \hat{S}_1 \qquad (13)$$

and wherein $\alpha_1$, $\alpha_2$, and $\alpha_3$ are weighting factors for each of the dry speech $\hat{S}_d$, the dry speech and early reverberation $\hat{S}_e$ and the dry speech, early reverberation and late reverberation $\hat{S}_1$.

Thus, by e.g. setting $\alpha_2$ and $\alpha_3$ to small values relative $\alpha_1$ the dry speech will be emphasized in the output audio signal $S_{out}$ and by setting $\alpha_1$ and $\alpha_3$ to small values relative $\alpha_2$ the dry speech with early reverberation will be emphasized in the output audio signal $S_{out}$.

With late reverberation it is meant speech reverberation with a reverberation time which exceeds a predetermined threshold and with early reverberation it is meant speech reverberation with a time constant below the predetermined threshold.

The speech isolator model 11' may comprise one trained model for each of the different speech types $\hat{S}_d$, $\hat{S}_e$, $\hat{S}_l$ or the speech isolator may comprise a single isolator model 11' trained to predict one mask for separating each of the different types of speech $\hat{S}_d$, $\hat{S}_e$, $\hat{S}_l$.

While the implementation of the audio processing system 1 in FIG. 5 extracts the speech types which differ in terms of reverberation it is envisaged that speech types which differ in other ways may be used as an alternative to, or in addition to, the speech types $\hat{S}_d$, $\hat{S}_e$, $\hat{S}_l$ with different reverberation properties. For instance, the speech isolator model 11' may be configured (trained) to separate at least two types of speech which differ in the at least one of: the gender of voice uttering the speech, the age of the voice uttering the speech, and the language of the speech.

Figure 6B:
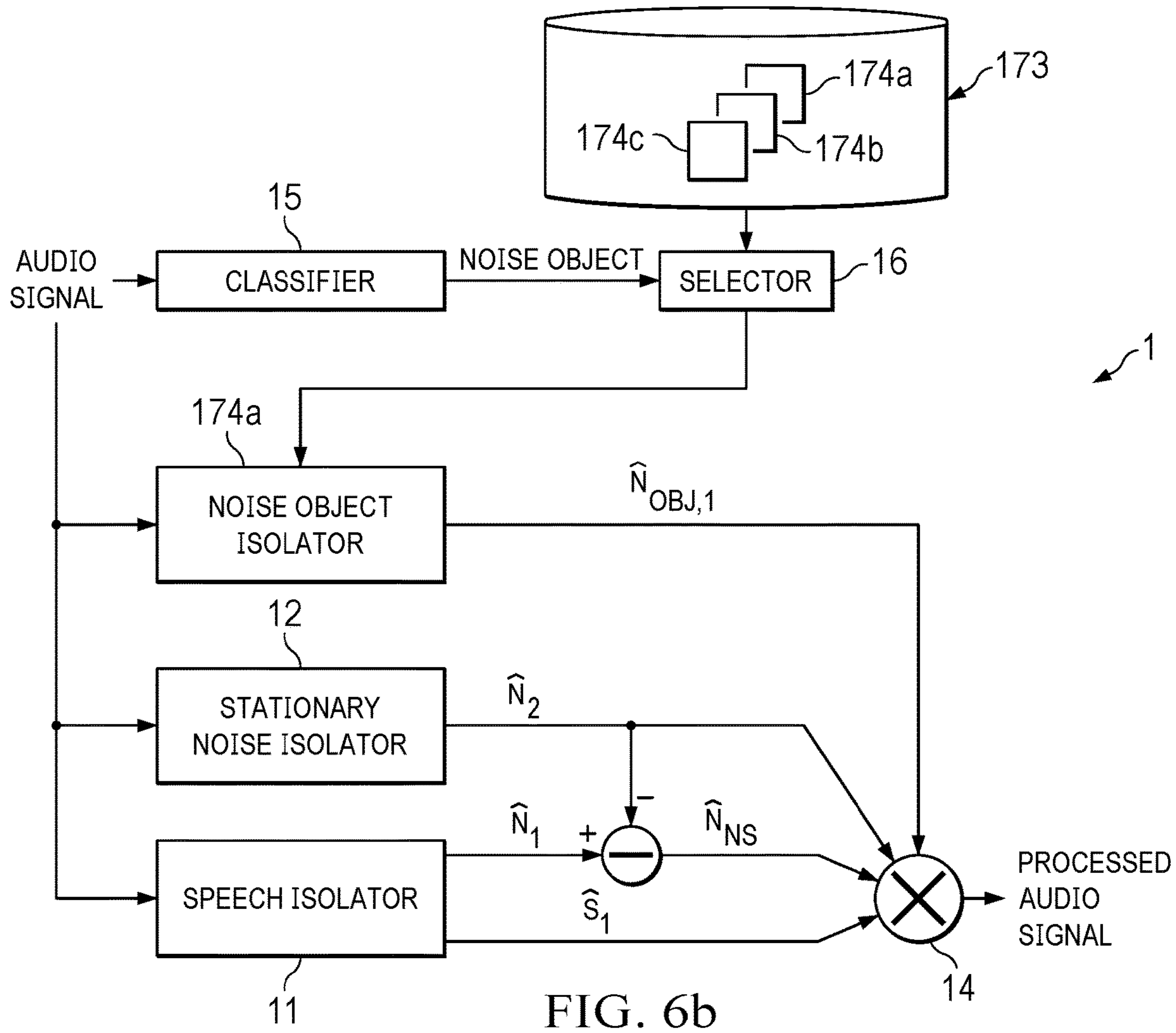
Figure 6C:
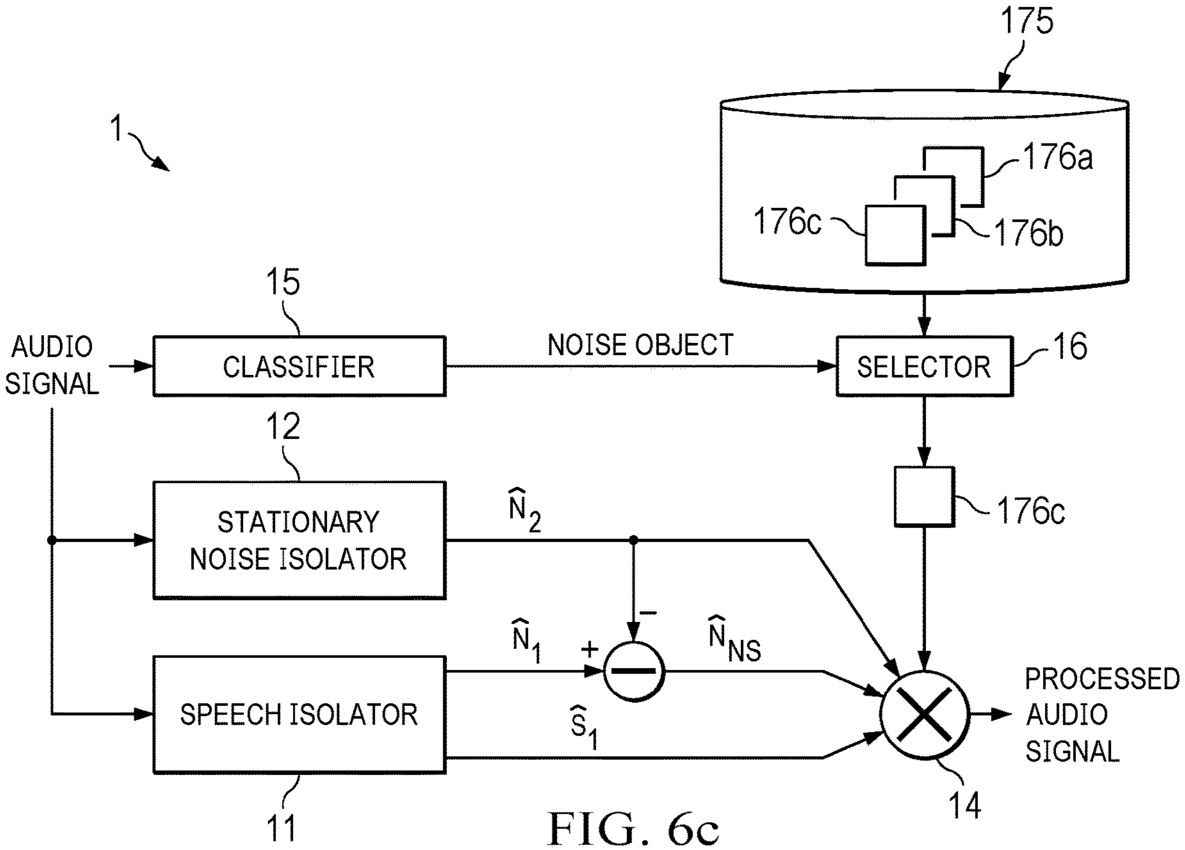

FIGS. 6*a*, 6*b* and 6*c* each illustrates a block diagram of an audio processing system 1 comprising a classifier 15 according to some implementations which now will be described in more detail.

In FIG. 6*a* the classifier 15 receives the audio signal and the classifier 15 is trained predict the presence of at least noise object in the audio signal. The classifier 15 may further be trained to predict the presence of at least noise object in the audio signal, wherein the at least one noise object being at least one noise object of a predetermined set of noise objects. For example, the classifier 15 may be trained to predict the presence of at least one of birdsong, traffic sounds, wind sounds, rain sounds, thunder sounds, siren sounds, airplane sounds, helicopter sounds and machine sound (such as the sound of a washing machine, drill, or lawnmower) in the audio signal. Based on the at least one noise object which is predicted to be present in the audio signal the selector 16 selects filter data 172*a*, 172*b*, 172*c* associated with the predicted noise object and applies a filter 13' as described by the selected filter data 172*a*, 172*b*, 172*c* to the non-stationary noise. For example, the classifier 15 predicts that birdsong is present in the audio signal whereby a birdsong filter 13' selected by the selector 16 to be applied to the non-stationary noise content $\hat{N}_{NS}$.

To this end, the classifier 15 may be a neural network trained to predict the presence of at least one noise object given a representation of an audio signal. It is envisaged that the neural network predicts a likelihood of the audio signal comprising one or more predetermined noise objects, wherein the noise object associated with the greatest likelihood is the predicted noise object.

The selector 16 may retrieve the filter 13' from a database 171 of different sets of filter data 172*a*, 172*b*, 172*c* wherein each set of filter data is associated with a noise object and describes a filter 13' to be applied. For instance, for each noise object present in the predetermined set of noise objects which are possible outputs of the classifier 15 there is a corresponding set of filter data 172*a*, 172*b*, 172*c* in the database 171. Additionally, as seen in FIG. 6*a* the non-stationary noise $\hat{N}_{NS}$ may be provided to the mixing unit 14 in addition to the filtered non-stationary noise whereby each of the non-stationary noise $\hat{N}_{NS}$ and the filtered non-stationary noise is provided with a respective weighting factor allowing the relative signal strength of the non-stationary noise $\hat{N}_{NS}$ relative to the filtered non-stationary noise to be modified as desired (e.g. by a user or mixing engineer).

In the exemplary embodiment shown in FIG. 6*a* the classifier 15 predicts birdsong as one noise object which is present in the audio signal and provides an indication of birdsong to the selector 16. The selector 16 accesses the database 171 and finds that filter data 172*b* describes a filter 13' associated with birdsong (e.g. the filer with a passband between 3 kHz and 7 kHz as mentioned in the above) whereby the selector 16 selects filter data 172*b* and enables the birdsong filter 13' to be applied to the non-stationary noise content $\hat{N}_{NS}$.

FIG. 6*b* depicts another audio processing system 1 comprising a classifier 15 according to some implementations. The classifier 15 predicts the presence of at least one noise object (e.g. the presence of at least one noise object of a predetermined set of noise objects) and provides the predicted noise object(s) to a selector 16. The selector 16 accesses a database 173 of trained noise object isolation models 174*a*, 174*b*, 174*c* and selects at least one trained noise object isolation model 174*a* trained to predict a mask for isolating the at least one predicted noise object $\hat{N}_{OBJ,1}$. The predicted mask of the selected noise object isolation model 174*a* is applied to the audio signal to obtain the noise object $\hat{N}_{OBJ,1}$. The noise object $\hat{N}_{OBJ,1}$ is in turn provided to the mixing unit 14 and combined with the non-stationary noise $\hat{N}_{NS}$, stationary noise $\hat{N}_S$ and speech content $S_1$ wherein each content type is provided with a respective weighting factor. Thus, the user or mixing engineer may set the weighting factors as desired and e.g. suppress the stationary and non-stationary noise $\hat{N}_{NS}$, $\hat{N}_S$ and amplify only the noise object $\hat{N}_{OBJ,1}$ of the non-stationary noise and the speech content $S_1$.

While the audio processing system 1 in FIG. 6*a* and FIG. 6*b* uses a classifier 15 and selector 16 to select appropriate filter data 172*a*, 172*b*, 172*c* or noise object isolator model 174*a*, 174*b*, 174*c* it is envisaged that the classifier 15 and selector 16 may select more than one, such as two or more, filters or noise object isolator models if two or more noise objects are detected to be present in the audio signal by the classifier 15. Moreover, the filter or noise object isolator models may be associated with a group of noise objects rather than just a single noise object. For instance, there may be trained nature object isolator model or nature filter trained which is selected when the classifier 15 detects at least one of birdsong, the sound of rattling leaves or the sound of rain.

In connection to FIGS. 6*a* and 6*b* in the above it is explained how the classifier 15 and selector 16 is used to dynamically, and based on the content of the audio signal, change the filter 13' to be applied to the non-stationary noise or which object noise isolator model 174*a*, 174*b*, 174*c* to use. Accordingly, the number of audio content types which are provided to the mixing unit 14 may change depending on the contents of the audio signal whereby the user or mixing engineer may select a desired relative signal strength for each of the components by selecting the 30) weighting factors manually. However, as shown in FIG. 6*c* the weighting factors may be determined automatically, e.g. selected by the selector 16 from a database 175 of weighting factor sets 176*a*, 176*b*, 176*c* based on which noise object(s) the classifier 15 predicts to be present in the audio signal. Each set 176*a*, 176*b*, 176*c* of weighting factors in the database comprising a value for at least each one of $\alpha_2$, $\gamma_2$ and $\mu_2$.

For instance, if the classifier 15 predicts the presence of birdsong the selector 16 may select a set of weighting factors 176*c* which suppresses the stationary noise, amplifies the non-stationary noise and amplifies the speech content as birdsong is considered to not disturb the speech intelligibility while adding a pleasant ambiance. On the other hand, if the classifier 15 predicts the presence of wind sounds the selector 16 may select a different set of weighting factors 176*a* which suppresses the stationary noise and the non-stationary noise (which includes the wind sound) while amplifying the speech content as wind sounds is considered to not be an unwanted disturbance.

In this manner, the selector 16 automatically selects a suitable weighting factor set 176*a*, 176*b,* 176c for all audio signals according to a predetermined set of rules wherein a user or mixing engineer, optionally, provides some preferences to modify the rules. The preferences e.g. indicates a desire to suppress some noise objects more than others (e.g. suppress all manmade noise objects such as machine sounds and traffic sounds but keep all nature sounds such as birdsong, rain sound and thunder sound). Alternatively or additionally, the preferences e.g. indicates a desire to enhance speech intelligibility at the cost of less ambience wherein any reverberation and stationary noise is omitted entirely and any noise object is attenuated.

In some implementations (not shown) the classifier 15 may receive the non-stationary noise content $\hat{N}_{NS}$ (instead of the entire audio signal) which has been extracted using the output of the stationary noise isolator model 12 and the speech isolator model 11. As the noise objects will be in the non-stationary noise content $\hat{N}_{NS}$ the classifier 15 can still correctly predict the presence of at least one noise object while the classification can be made more accurate due to the non-stationary noise $\hat{N}_{NS}$ including only audio content being a true subset of the audio signal content.

Figure 7:
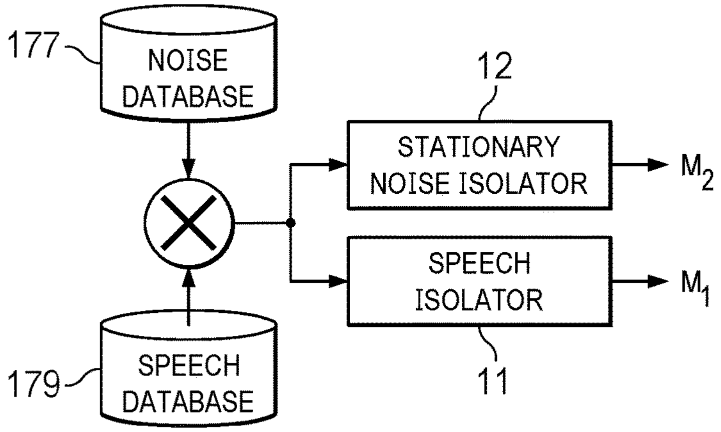
FIG. 7 shows an exemplary setup for training a stationary noise isolator model and a speech isolator model according to some implementations.

FIG. 7 illustrates how the stationary noise isolator model 12 and the speech isolator model 11 may be trained to predict a corresponding mask $M_1$, $M_2$. Training data in the form speech is obtained from a speech database 179 wherein the speech database 179 comprises audio signals with clean speech audio signals corresponding to a multitude of different speakers, languages and signal bitrates. Similarly, noise training data is obtained from a noise database 177 wherein the noise comprises a plurality of non-speech sounds such as stationary noise of different types (e.g. white noise) and non-stationary noise of different types (such as rain sound or the sound of a barking dog). The training speech and noise data is combined in a mixer and provided to each of the stationary noise isolator model 12 and the speech isolator model 11 for training.

During training the internal weights and/or parameters of the isolation models 11, 12 are adjusted so as to predict mask $M_1$ which accurately isolates the speech and mask $M_2$ which accurately isolates the stationary noise. To accomplish this, the resulting audio signal after applying mask $M_1$ is compared to a ground truth signal comprising the clean speech from the speech database 179 and the resulting audio signal after applying mask $M_2$ is compared to a ground truth signal comprising only the stationary noise added from the noise database 177. By changing the internal weights and/or parameters of the isolation models 11, 12 so as to minimize discrepancies between the audio signal with the respective mask applied and the ground truth signal the models 11, 12 will gradually learn to predict masks $M_1$, $M_2$ for accurate speech separation and stationary noise separation.

The one or more noise object isolator models 174*a*, 174*b*, 174*c* of the database 173 described in connection to FIG. 6*b* may obtained by a similar training setup. However, for a noise object isolator model 174*a*, 174*b*, 174*c* the ground truth signal will be a clean signal representing the noise object (such as the above mentioned example audio signal) and the training signal is the clean signal representing the noise object mixed with at least one of other noise objects, speech and stationary noise.

Unless specifically stated otherwise, as apparent from the following discussions, it is appreciated that throughout the disclosure discussions utilizing terms such as “processing”, “computing”, “calculating”, “determining”, “analyzing” or the like, refer to the action and/or processes of a computer hardware or computing system, or similar electronic computing devices, that manipulate and/or transform data represented as physical, such as electronic, quantities into other data similarly represented as physical quantities.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the embodiments of the invention utilizes more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention. Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with instructions for carrying out such a method or element of a method forms a means for carrying out the method or element of a method. Note that when the method includes several elements, e.g., several steps, no ordering of such elements is implied, unless specifically stated. Furthermore, an element described herein of an apparatus embodiment is an example of a means for carrying out the function performed by the element for the purpose of carrying out the embodiments of the invention. In the description provided herein, numerous specific details are set forth. However, it is understood that embodiments of the invention may be practiced without these specific details. In other instances, well-known methods, structures and techniques have not been shown in detail in order not to obscure an understanding of this description.

The person skilled in the art realizes that the aspects of the invention by no means is limited to the embodiments described above. On the contrary, many modifications and variations are possible within the scope of the appended claims. For example, while the classifier 15 and selector 16 of the implementations depicted in FIG. 6*a*, 6*b*, 6*c* are used to select filter data 172*a*, 172*b*, 172*c*, noise object separator model 174*a*, 174*b*, 174*c* or a set of weighting factors 176*a*. 176*b*, 176*c* it is envisaged that the classifier and selector may select two or all three of a filter(s), a noise object separator model(s) or a set of weighting factors simultaneously. For instance, while a noise object separator model 174*a*, 174*b*, 174*c* may be sufficient to separate a noise object a filter 13' may be used to further enhance the quality of the isolation of the noise object.

Various aspects of the present invention may be appreciated from the following enumerated example embodiments (EEEs):

EEE1. A method of processing audio, the method comprising:
- receiving an audio signal including a mixture of speech content and noise content:
- determining, from the noise content, background noise and object noise;
- enhancing the speech content to generate speech enhanced audio, wherein enhancing the speech content comprises applying one or more first gains to the speech content, one or more second gains to the background noise, and one or more third gains to the object noise; and
- providing the speech enhanced audio to a downstream device.

EEE2. The method of EEE 1, wherein determining the background noise and object noise comprises combining and remixing a type one noise and a type two noise, the type one noise and type two noise being defined in a noise database and each corresponding to a respective model for generating a respective mask for enhancing speech under a respective type of noise.

EEE3. The method of EEE 2, wherein the background noise corresponds to the type one noise, and the object noise corresponds to a difference between the type one noise and the type two noise.

EEE4. The method of EEE 2 or 3, wherein at least one of the one or more second gains or the one or more third gains are different from gains corresponding to the type one noise and type two noise as prescribed in the respective models.

EEE5. A method of processing audio, comprising:
- receiving audio mixtures; and
- separating and remixing the audio mixtures based on particular types of sources.

EEE6. The method of EEE 5, where the types of sources include at least one of noise or instrumental sound.

EEE7. The method of EEE 5 or 6, comprising:
- solving issues of overlap between types of sources by giving a definition of a type wherein difference information between types is used for remixing.

EEE8. The method of any of EEEs 5 to 7, comprising performing post-processing, including extending from the particular types of sources to other types of sources.

EEE9. The method of any of EEEs 5 to 8, comprising:
- combining classifiers of the types of sources to indicate a new source type; and
- performing separation and mixing using the new source type.

EEE10. A system comprising:
- one or more processors; and
- a non-transitory computer-readable medium storing instructions that, upon execution by the one or more processors, cause the one or more processor to perform operations of 1-9.

EEE11. A non-transitory computer-readable medium storing instructions that, upon execution by one or more processors, cause the one or more processor to perform operations of 1-9.

The invention claimed is:

1. A method of processing audio for source separation, the method comprising:
- obtaining an audio signal including a mixture of speech content and noise content;
- determining, from the audio signal, speech content;
- determining, from the audio signal, stationary noise content;
- determining, from the audio signal, non-speech content, wherein the stationary noise content is a true subset of the non-speech content;
- determining, based on a difference between the stationary noise content and the non-speech content, a non-stationary noise content;
- obtaining a set of weighting factors, the set comprising a weighting factor corresponding to each of said speech content, said stationary noise content, and said non-stationary noise content respectively; and
- forming a processed audio signal based on a combination of the speech content, the stationary noise content, and the non-stationary noise content weighted with the respective weighting factor.

2. The method according to claim 1, wherein determining the stationary noise content comprises:
- providing the audio signal to a stationary noise isolator model trained to predict a stationary noise mask for removing stationary noise content from the audio signal; and
- determining the stationary noise content based on the stationary noise mask and the audio signal.

3. The method according to claim 1, wherein determining the non-speech content comprises:
- providing the audio signal to a speech isolator model trained to predict a noise mask for removing non-speech content from the audio signal; and
- determining non-speech content based on the noise mask and the audio signal.

4. The method according to claim 1, further comprising:
- bandpass filtering the non-stationary noise content with a bandpass filter configured to isolate a noise object in the non-stationary noise content.

5. The method according to claim 4, further comprising:
- bandpass filtering the non-stationary noise content with at least two different bandpass filters, each bandpass filter being configured to isolate a different noise object in the non-stationary noise.

6. The method according to claim 4, further comprising: providing the audio signal to a noise object classifier model, the classifier model being trained to output a prediction of a noise object present in the audio signal;
providing a plurality bandpass filters, each configured to isolate a different noise object in the non-stationary noise; and
selecting the bandpass filter associated with the predicted noise object.

7. The method according to claim 4, wherein each bandpass filter has been obtained by:
collecting an example audio signal, the example audio signal comprising at least one example of a noise object;
determining the frequency distribution of the example audio signal; and
defining the bandpass filter based on the frequency distribution of the example audio signal.

8. The method according to claim 4, further comprising smoothing the filtered non-stationary noise with a smoothing filter.

9. The method according to claim 1, wherein the weighting factors indicates boosting the non-stationary noise content with respect to the stationary noise content.

10. The method according to claim 1, further comprising: providing at least two sets of weighting factors, each set of weighting factors being associated with a respective audio source type;
providing the audio signal to a classifier model, trained to output a prediction of a noise object present in the audio signal; and
wherein obtaining a set of weighting factors comprises: selecting a set of said at least two sets, the selected set being associated with the predicted noise object.

11. The method according to claim 1, further comprising: determining, based on the audio signal, at least one noise object, the noise object forming a true subset of the non-stationary noise content; and
wherein the set of weighting factors further comprises a noise object weighting factor for each noise object, and wherein said combination is further based on the noise object weighted with the noise object weighting factor.

12. The method according to claim 11, wherein determining at least one noise object comprises:
providing the audio signal to an object isolation model trained to predict a mask for separating the noise object from the audio signal; and
determining the noise object based on the audio signal and the mask for separating the noise object from the audio signal.

13. The method according to claim 11, further comprising:
providing a plurality of trained object isolation models, each model trained to predict a mask for separating a different noise object from an audio signal;
providing the audio signal to a classifier model, trained to output a predicted noise object present in the audio signal;
selecting, from said plurality of trained object isolation models, the trained object isolation model associated with the predicted noise object; and
providing the audio signal to the selected object isolation model to predict a mask for separating the predicted noise object from the audio signal.

14. The method according to claim 1, wherein the difference between the stationary noise content and the non-speech content is calculated such that the non-stationary noise is independent from the stationary noise.

15. The method according to claim 1, wherein determining the non-stationary noise content comprises:
capturing all content that is neither the stationary noise content nor the speech content.

16. The method according to claim 1, further comprising: determining, based on applying a mask to the audio signal to remove the stationary noise content, a residual content that is all content of the audio signal excluding the stationary noise content; and
obtaining a second set of weighting factors, the second set comprising a weighting factor corresponding to each of the residual content, the non-speech content, and the stationary noise content, respectively, wherein a mapping exists between the set of weighting factors and the second set of weighting factors; and
forming the processed audio signal based on a combination of the residual content, the non-speech content, and the stationary noise content.

17. An audio processing system, the audio processing system comprising:
an audio content separation unit, the audio content separation unit being configured to:
obtain an audio signal, the audio signal including a mixture of speech content and noise content,
determine, from the audio signal, speech content,
determine, from the audio signal, stationary noise content,
determine, from the audio signal, non-speech content, wherein the stationary noise content is a true subset of the non-speech content, and
determine, based on a difference between the stationary noise content and the non-speech content, a non-stationary noise content,
the audio processing system further comprising a mixing unit configured to:
obtain a set of weighting factors, the set comprising a weighting factor corresponding to each of said speech content, said stationary noise content, and said non-stationary noise content respectively, and
form a processed audio signal based on a combination of the speech content, the stationary noise content, and the non-stationary noise content weighted with the respective weighting factor.

18. A non-transitory computer-readable medium storing instructions that, upon execution by one or more processors, cause the one or more processor to perform the method of claim 1.

* * * * *